(12) United States Patent
Tanaka

(10) Patent No.: US 9,970,329 B2
(45) Date of Patent: May 15, 2018

(54) EXHAUST HEAT RECOVERY DEVICE

(71) Applicant: Sanden Holdings Corporation, Isesaki-shi, Gunma (JP)

(72) Inventor: Yuuta Tanaka, Isesaki (JP)

(73) Assignee: Sanden Holdings Corporation, Isesaki-shi, Gunma (JP)

(*) Notice: Subject to any disclaimer, the term of this patent is extended or adjusted under 35 U.S.C. 154(b) by 133 days.

(21) Appl. No.: 15/021,666

(22) PCT Filed: Sep. 11, 2014

(86) PCT No.: PCT/JP2014/074044
§ 371 (c)(1),
(2) Date: Mar. 11, 2016

(87) PCT Pub. No.: WO2015/037653
PCT Pub. Date: Mar. 19, 2015

(65) Prior Publication Data
US 2016/0230607 A1    Aug. 11, 2016

(30) Foreign Application Priority Data

Sep. 12, 2013 (JP) ................. 2013-189101

(51) Int. Cl.
*F01K 23/10* (2006.01)
*F02G 5/00* (2006.01)
(Continued)

(52) U.S. Cl.
CPC .......... *F01K 23/101* (2013.01); *F01C 1/0215* (2013.01); *F01K 15/02* (2013.01);
(Continued)

(58) Field of Classification Search
CPC ...... F01C 1/0215; F01K 15/02; F01K 23/065; F01K 23/101; F02G 5/00; F02G 5/02; Y02T 10/166
(Continued)

(56) References Cited

U.S. PATENT DOCUMENTS 9,657,603 B2 * 5/2017 Grelet ................... F01K 23/065
9,745,887 B2 * 8/2017 Honda .................. F01P 3/2285
(Continued)

FOREIGN PATENT DOCUMENTS

JP    2008-274834 A    11/2008
JP    2010-190185 A    9/2010
(Continued)

OTHER PUBLICATIONS

Machine Translation JP 2012-193690 Done Sep. 18, 2017.*
(Continued)

*Primary Examiner* — Patrick Maines
*Assistant Examiner* — Dapinder Singh
(74) *Attorney, Agent, or Firm* — Baker Botts L.L.P.

(57) ABSTRACT

In an exhaust heat recovery device provided with a Rankine cycle device, a clutch for transmitting and interrupting power between an engine and the Rankine cycle device is released appropriately to prevent the Rankine cycle from becoming a load on the engine. An exhaust heat recovery device 1A includes a Rankine cycle device 2A, a power transmission mechanism 3A, and a control unit 4. The power transmission mechanism 3A has a clutch 31 and is capable of transmitting power between an engine 10 and the Rankine cycle device 2A when the clutch 31 is engaged. The control unit 4A controls the engagement and disengagement of the clutch 31 based on a first correlation value correlated with consumed power when the Rankine cycle device 2A is started, and a second correlation value correlated with consumed power of the Rankine cycle device 2A when the output of the Rankine cycle device 2A is negative during the operation of the Rankine cycle device 2A after the start-up.

19 Claims, 7 Drawing Sheets

(51) Int. Cl.
*F02G 5/02* (2006.01)
*F01K 15/02* (2006.01)
*F01K 23/06* (2006.01)
*F01C 1/02* (2006.01)

(52) U.S. Cl.
CPC .............. *F01K 23/065* (2013.01); *F02G 5/00* (2013.01); *F02G 5/02* (2013.01); *Y02T 10/166* (2013.01)

(58) Field of Classification Search
USPC ........................................................ 60/618
See application file for complete search history.

(56) References Cited

U.S. PATENT DOCUMENTS

| | | | | |
|---|---|---|---|---|
| 2004/0255593 | A1* | 12/2004 | Brasz | F02C 6/18 60/772 |
| 2008/0087017 | A1* | 4/2008 | Van Nimwegen | F01N 3/005 60/599 |
| 2010/0090476 | A1 | 4/2010 | Wada | |
| 2014/0230761 | A1* | 8/2014 | Pilavdzic | F01P 3/2271 123/41.21 |

FOREIGN PATENT DOCUMENTS

| | | |
|---|---|---|
| JP | 2012-026452 A | 2/2012 |
| JP | 2012-041933 A | 3/2012 |
| JP | 2012-193690 A | 10/2012 |

OTHER PUBLICATIONS

Machine Translation JP 2010-190185 Done Sep. 18, 2017.*
Machine Translation JP 2012-026452 Done Sep. 18, 2017.*
German Patent and Trade Mark Office, Office Action issued in Patent Application No. DE 112014004215.3, dated Apr. 25, 2017.
Japan Patent Office, Notification of Reasons for Refusal issued in Patent Application No. JP 2013-189101, dated May 30, 2017.
The State Intellectual Property Office of the People's Republic of China, The First Office Action in Application No. CN 201480050191.0, dated Sep. 12, 2016.

* cited by examiner

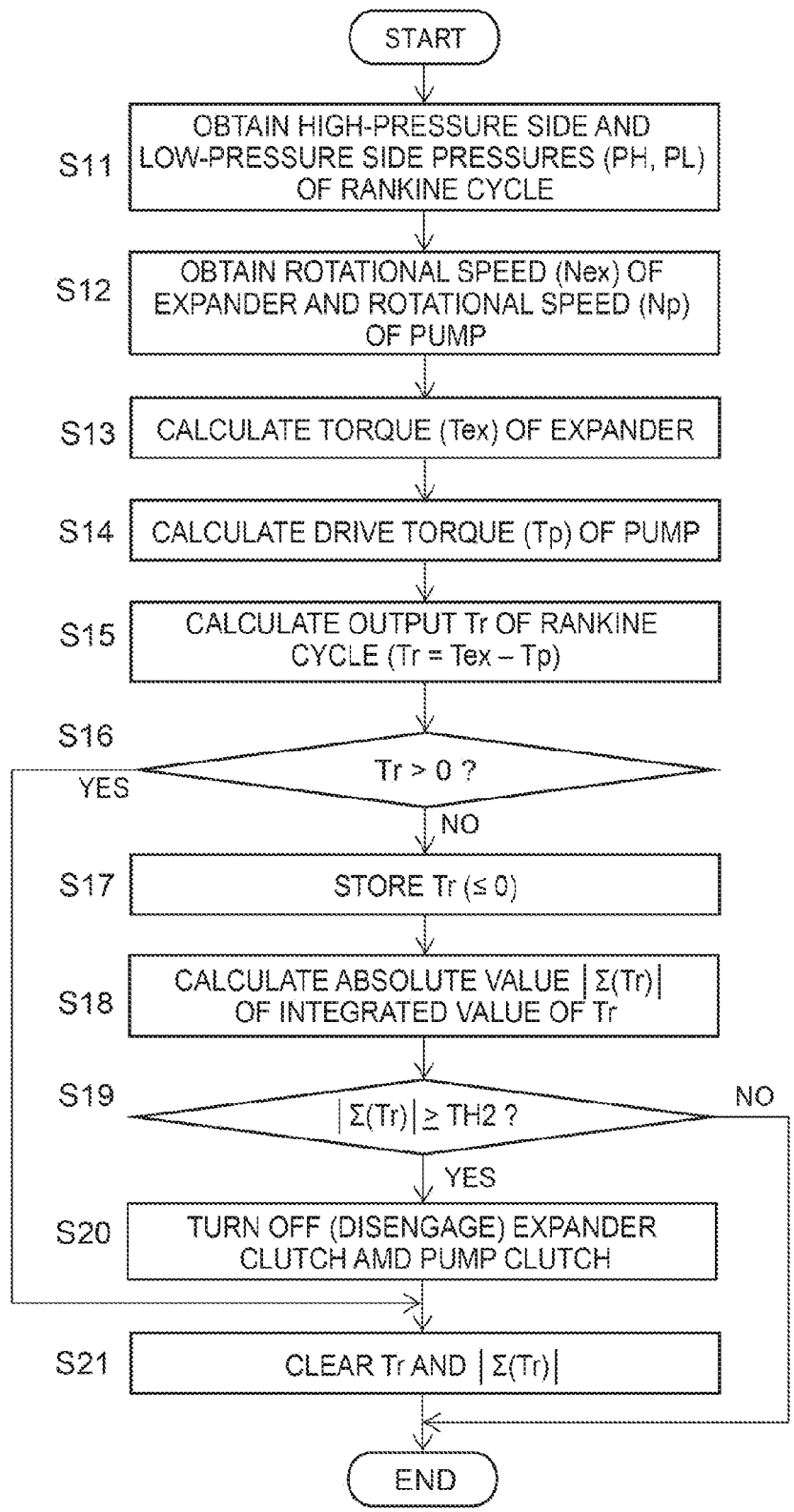

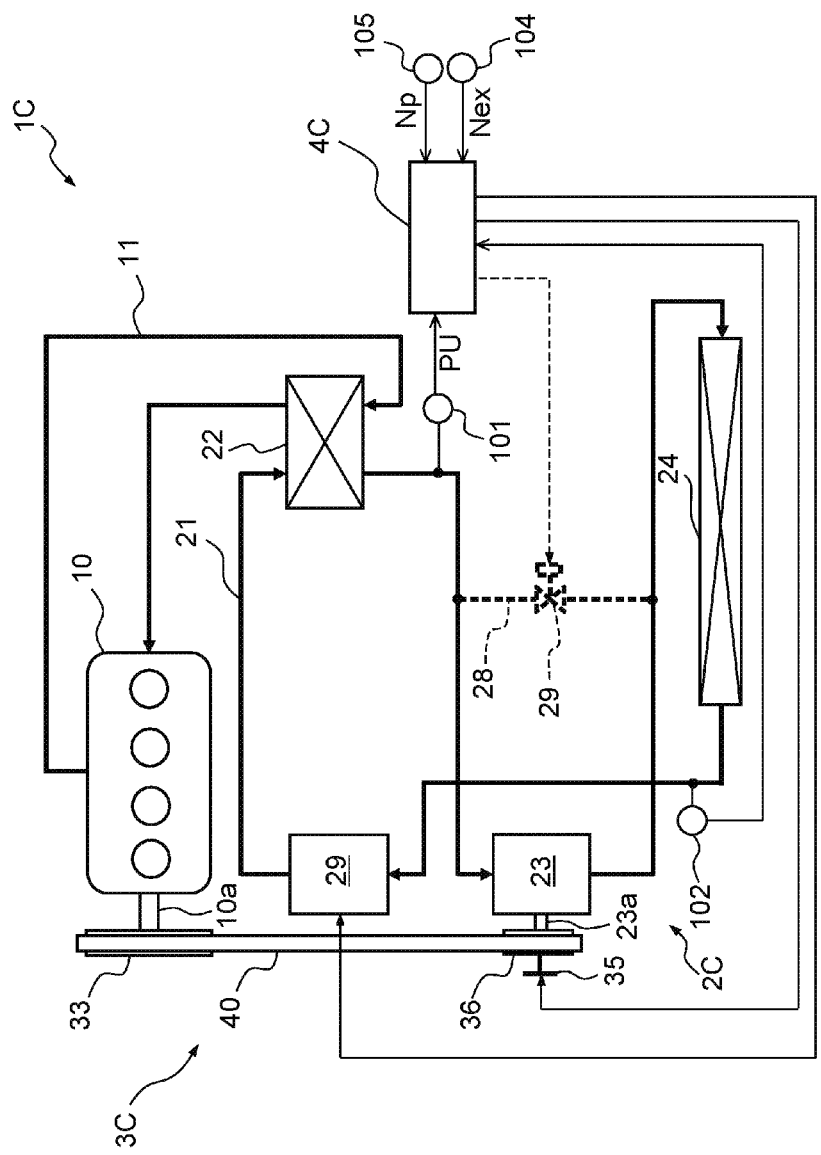

EXHAUST HEAT RECOVERY DEVICE

CROSS-REFERENCE TO RELATED APPLICATIONS

This application is a U.S. National Stage Patent Application under 37 U.S.C. § 371 of International Patent Application No. PCT/JP2014/074044, filed on Sep. 11, 2014, which claims the benefit of Japanese Patent Application No. JP 2013-189101, filed on Sep. 12, 2013, the disclosures of which are incorporated herein by reference in their entirety.

TECHNICAL FIELD

The present invention relates to an exhaust heat recovery device mounted on a vehicle and provided with a Rankine cycle that recovers exhaust heat (including waste heat) of an engine to generate power.

BACKGROUND ART

Patent Document 1 discloses a vehicle including an engine and a Rankine cycle system for recovering waste heat of the engine to a refrigerant to regenerate power by an expander. In the vehicle disclosed in Patent Document 1, a clutch is provided on a power transmission path between the engine and the expander. When a predicted value of regenerative power (torque) of the expander is positive, the clutch is engaged, while when the predicted value of regenerative power (torque) of the expander is zero or negative, the clutch is disengaged. In other words, in the vehicle disclosed in Patent Document 1, when the predicted value of the torque of the expander becomes zero or negative, the clutch is disengaged to stop the operation of the Rankine cycle system.

REFERENCE DOCUMENT LIST

Patent Document

Patent Document 1: Japanese Patent Application Laid-open Publication No. 2010-190185

SUMMARY OF THE INVENTION

Problems to be Solved by the Invention

In order to start up the Rankine cycle system, it is first necessary to drive a pump for circulating the refrigerant. After that, it takes a predetermined time until the expander generates torque. Therefore, the Rankine cycle system inevitably becomes a load on the engine for a certain amount of time upon the start-up. Similar to the vehicle disclosed in Patent Document 1, for example, when an electrically powered pump is used to circulate the refrigerant, the electrically powered pump is driven by electric power from a battery. Since the electric power consumed by the electrically pump at the time needs to be recharged into the battery by the engine, the Rankine cycle system becomes a load on the engine in the end. Furthermore, when a mechanical pump is used to circulate the refrigerant, since the mechanical pump is driven by the engine, the Rankine cycle system becomes a load on the engine.

Even during the operation of the Rankine cycle system, if the torque of the expander becomes zero or negative, the Rankine cycle system may be a load on the engine. However, even when the torque of the expander becomes negative during the operation of the Rankine cycle system, if the torque of the expander turns positive right away after that, the load of the Rankine cycle system on the engine may be relatively small.

Therefore, similar to the vehicle disclosed in Patent Document 1, if the operation of the Rankine cycle system is stopped immediately when the predicted value of the torque of the expander becomes zero or negative, there is a possibility that the load of the Rankine cycle system on the engine increases rather than the case in which the Rankine cycle system remains in operation without being stopped, to thereby decrease the fuel economy of the engine, and the like.

Therefore, it is an object of the present invention, in an exhaust heat recovery device provided with a Rankine cycle device that recovers exhaust heat of the engine to convert the exhaust heat to power using an expander, to effectively prevent the Rankine cycle device from becoming a load on an engine by appropriately making the engagement and disengagement of a clutch provided on a power transmission path between the engine and the Rankine cycle device.

Means for Solving the Problems

An exhaust heat recovery device according to one aspect of the present invention includes: a Rankine cycle device that is provided with a heater configured to heat and vaporize a refrigerant by exhaust heat of an engine, an expander configured to expand the refrigerant passed through the heater to generate power, a condenser configured to condense the refrigerant passed through the expander, and a pump configured to send the refrigerant passed through the condenser to the heater, the heater, the expander, the condenser, and the pump being arranged in a refrigerant circulation passage; a power transmission mechanism that has a clutch and is capable of transmitting power between the engine and the Rankine cycle device when the clutch is engaged; and a clutch control unit that controls the engagement and disengagement of the clutch based on a first correlation value correlated with consumed power when the Rankine cycle device is started, and a second correlation value correlated with consumed power of the Rankine cycle device when the output thereof is negative during the operation thereof after start-up.

Effects of the Invention

In the exhaust heat recovery device, the engagement and disengagement of the clutch is controlled based on the first correlation value correlated with consumed power when the Rankine cycle device is started, and the second correlation value correlated with consumed power of the Rankine cycle device when the output of the Rankine cycle device is negative during the operation of the Rankine cycle device. This can avoid the load on the engine being substantially increased by disengaging the clutch during the operation of the Rankine cycle device to stop the Rankine cycle device (and to restart the Rankine cycle device after that), to improve the fuel economy of the engine.

BRIEF DESCRIPTION OF THE DRAWINGS

FIG. 6 is a flowchart illustrating the content of clutch control in the second embodiment.

FIG. 7 is a view illustrating a schematic configuration of an exhaust heat recovery device according to a third embodiment of the present invention.

MODES FOR CARRYING OUT THE INVENTION

Embodiments of the present invention will be described below with reference to the accompanying drawings.

First Embodiment

Figure 1:
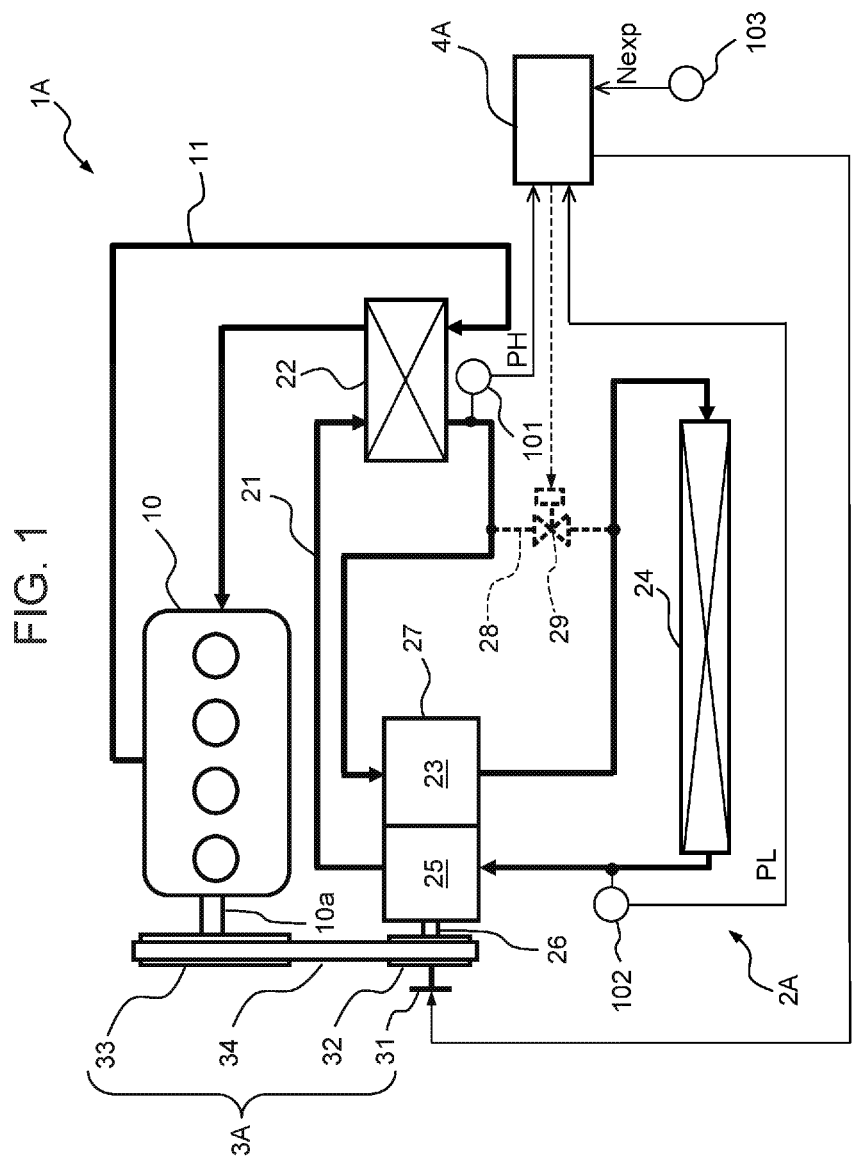
FIG. 1 is a view illustrating a schematic configuration of an exhaust heat recovery device according to a first embodiment of the present invention.

FIG. 1 illustrates a schematic configuration of an exhaust heat recovery device 1A according to a first embodiment of the present invention. This exhaust heat recovery device 1A is mounted on a vehicle to recover and use exhaust heat of an engine 10. As illustrated in FIG. 1, an exhaust heat recovery device 1A includes a Rankine cycle device 2A that recovers the exhaust heat of the engine 10 and converting it to power (generating power), a power transmission mechanism 3A that performs power transmission between the Rankine cycle device 2A and the engine 10, and a control unit 4A that controls the overall operation of the exhaust heat recovery device 1A.

The engine 10 is a water-cooled internal combustion engine and is cooled by engine cooling water that circulates through a cooling water flow passage 11. A heater 22 of the Rankine cycle device 2A to be described below is disposed on the cooling water flow passage 11, so that the engine cooling water that has absorbed heat from the engine 10 flows through the heater 22.

The heater 22, an expander 23, a condenser 24, and a pump 25 are arranged in a refrigerant circulation passage 21 of the Rankine cycle device 2A in this order.

The heater 22 is a heat exchanger which heats the refrigerant to obtain superheated vapor, by performing heat exchange between the engine cooling water that has absorbed heat from the engine 10 and the refrigerant. Alternatively, the heater 22 may also be configured to perform heat exchange between exhaust gas of the engine 10, instead of the engine cooling water, and the refrigerant.

The expander 23 is a scroll-type expander and generates power (torgue in this case) by expanding the refrigerant, which has become superheated vaper by heated by the heater 22, and by converting the expansion of the refrigerant to rotational energy.

The condenser 24 is a heat exchanger which performs heat exchange between the refrigerant passed through the expander 23 and ambient air, thereby cooling and condensing (liquefying) the refrigerant.

The pump 25 is a mechanical pump that sends the refrigerant (liquid refrigerant) liquefied by the condenser 24 to the heater 22. Then, since the refrigerant liquefied by the condenser 24 is sent to the heater 22 by the pump 25, the refrigerant circulates through each of the components of the Rankine cycle device 2A.

In the embodiment, the expander (scroll-type expander) 23 and the pump (mechanical pump) 25 are integrally connected by a common rotating shaft 26 and configured as a "pump-integrated expander 27". That is, the rotating shaft 26 of the pump-integrated expander 27 has a function as an output shaft of the expander 23 and a drive shaft of the pump 25.

The power transmission mechanism 3A has an electromagnetic clutch 31, a pulley 32 attached to the rotating shaft 26 of the pump-integrated expander 27 through this electromagnetic clutch 31, a crank pulley 33 attached to a crankshaft 10a of the engine 10, and a belt 34 wrapped around the pulley 32 and the crank pulley 33. In the power transmission mechanism 3A, it is possible to transmit and interrupt power between the engine 10 and the Rankine cycle device 2A (specifically, the pump-integrated expander 27) by turning ON (engaging) and OFF (disengaging) the electromagnetic clutch 3. Note that the installation position of the electromagnetic clutch 31 does not matter as long as the electromagnetic clutch 31 can transmit and interrupt power between the engine 10 and the Rankine cycle device 2A.

The control unit 4A is configured to be capable of transmitting and receiving information to and from an engine control unit (not illustrated) that controls the engine 10. For example, the control unit 4A can obtain, from the engine control unit, various pieces of information, such as the rotational speed Ne of the engine 10 and the temperature Tw of the engine cooling water. Furthermore, detection signals of various sensors are input to the control unit 4A, in which the various sensors include a first pressure sensor 101 for detecting a high-pressure side pressure PH of the Rankine cycle device 2A, a second pressure sensor 102 for detecting a low-pressure side pressure PL of the Rankine cycle device 2A, and a rotation sensor 103 for detecting the rotational speed Nexp (=the rotational speed of the expander 23=the rotational speed of the pump 25) of the pump-integrated expander 27.

Here, the high-pressure side pressure PH of the Rankine cycle device 2A means a pressure in the refrigerant circulation passage 21 in a section extending from (the outlet of) the pump 25 to (the inlet of) the expander 23 through the heater 22, and the low-pressure side pressure PL of the Rankine cycle device 2A means a pressure in the refrigerant circulation passage 21 in a section extending from (the outlet of) the expander 23 to (the inlet of) the pump 25 through the condenser 24. In the embodiment, the first pressure sensor 101 detects a pressure on the inlet side of the expander 23 (on the outlet side of the heater 22) as the high-pressure side pressure PH of the Rankine cycle device 2A, and the second pressure sensor 102 detects a pressure on the inlet side of the pump 25 (on the outlet side of the condenser 23) as the low-pressure side pressure PL of the Rankine cycle device 2A.

The rotation sensor 103 may be omitted. In this case, the control unit 4A can calculate the rotational speed Nexp of the pump-integrated expander 27 based on the rotational speed Ne of the engine 10 (and the pulley ratio between the pulley 31 and the crank pulley 32).

Based on the input detection signals of the various sensors and information from the engine control unit, the control unit 4A performs various control including the control (engagement and disengagement) of the electromagnetic clutch 31.

For example, when start-up conditions of the Rankine cycle device 2A are satisfied, the control unit 4A turns ON (engages) the electromagnetic clutch 31. This causes the engine 10 to drive the pump 25 (the pump part of the pump-integrated expander 27) to start up the Rankine cycle device 2A. Therefore, when the Rankine cycle device 2A is started, the pump 25 and the expander 23 having the rotating shaft 26 shared with the pump 25 (i.e., the pump-integrated expander 27) of the Rankine cycle device 2A become a load on the engine 10. Note that the start-up conditions of the Rankine cycle device 2A can be set accordingly. For example, the start-up conditions may include that the temperature Tw of the engine cooling water is higher than or equal to a predetermined temperature and that a predetermined time has elapsed since the Rankine cycle device 2A is stopped.

When the Rankine cycle device 2A is started up, the refrigerant circulates through the refrigerant circulation passage 21 by means of the pump 25 (the pump part of the pump-integrated expander 27) to cause the expander 23 (the expander part of the pump-integrated expander 27) to start generating power. After that, when the expander 23 begins generating sufficient power (torque) (i.e., upon completion of start-up of the Rankine cycle 2), part of the power generated by the expander 23 is used to drive the pump 25, and the remaining power is transmitted to the engine 10 through the power transmission mechanism 3A to assist the output of the engine 10. This can improve the fuel economy of the engine 10.

Furthermore, for example, when determining that there is a need to stop the Rankine cycle device 2A during the operation of the Rankine cycle device 2A, or when receiving a request for stopping the Rankine cycle device 2A from the engine control unit, the control unit 4A turns OFF (disengages) the electromagnetic clutch 31 to stop the Rankine cycle device 2A.

If the output of the Rankine cycle device 2A (here, the torque of the pump-integrated expander 27) during the normal operation of the Rankine cycle device 2A after the (completion of) start-up becomes zero or negative, the Rankine cycle device 2A becomes a load on the engine 10. For example, when the superheat degree of the refrigerant on the upstream side of the expander 23 is insufficient or when a thermal load of the condenser 24 is high, a pressure difference before and after the expander 23 may be insufficiently, resulting in the generation power (torque) of the expander 23≤the drive torque of the pump 25. That is, the output of the Rankine cycle device 2A (i.e., the torque of the pump-integrated expander 27=the generation torque of the expander 23-the drive torque of the pump 25) may be zero or negative. In such a case, the exhaust heat recovery device 1A for improving the fuel economy of the engine 10 undesirably becomes a load on the engine 10 (the cause of decreasing the fuel economy of the engine 10).

Therefore, the control unit 4A computes the torque Texp of the pump-integrated expander 27 (the output of the Rankine cycle device 2A) every predetermined period, and when the torque of the pump-integrated expander 27 becomes zero or negative during the normal operation of the Rankine cycle device 2A after start-up, the control unit 4A turns OFF (disengages) the electromagnetic clutch 31 in the ON (engaged) state to interrupt the power transmission between the engine 10 and the Rankine cycle 2A to thereby stop the Rankine cycle device 2A. This prevents the Rankine cycle device 2A from becoming the load on the engine 10.

Note that the control unit 4A does not turn the electromagnetic clutch 31 OFF immediately after the output of the Rankine cycle device 2A (the torque Texp of the pump-integrated expander 27) becomes zero or negative. The control unit 4A turns the electromagnetic clutch 31 OFF when the state in which the output (torqueTexp) of the Rankine cycle device 2A is zero or negative is continued or when the negative state is expected to be continued. The reason for this is that, since the Rankine cycle device 2A becomes the load on the engine 10 when the Rankine cycle device 2A is started as described above, if the operation of the Rankine cycle device 2A is stopped at the time when the output (torqueTexp) of the Rankine cycle device 2A becomes zero or negative, there is a possibility that the load on the engine 10 increases rather than the case in which the Rankine cycle device 2A remains in operation without being stopped.

Specifically, in the embodiment, the control unit 4A turns OFF the electromagnetic clutch 31 in the ON state to stop the Rankine cycle device 2A in a case that consumed power (or the correlation value) of the Rankine cycle device 2A when the output of the Rankine cycle device 2A is negative during the operation of Rankine cycle device 2A after start-up is negative becomes, or is expected to become, higher than or equal to consumed power (or the correlation value) when the Rankine cycle device 2A is started.

In the embodiment, the consumed power when the Rankine cycle device 2A is started means power consumed by the Rankine cycle device 2A (mainly by the pump-integrated expander 27) during a period from starting up the Rankine cycle device 2A in the stopped state (from the start of driving the pump 25) until the output of the Rankine cycle device 2A becomes "positive."

Furthermore, for example, when the start-up conditions are satisfied after turning the electromagnetic clutch 31 OFF, the control unit 4A can turn the electromagnetic clutch 31 ON again to start up (restart) the Rankine cycle device 2A.

That is, in the embodiment, the control unit 4A has a function as a "clutch control unit" and an "output computing unit" of the present invention.

Here, as indicated by the broken line in FIG. 1, a bypass flow passage 28 for bypassing the expander 23, and a bypass valve 29 for opening and closing this bypass flow passage 28 may be provided so that the control unit 4A opens or closes the bypass valve 29 as needed. In this case, when starting up the Rankine cycle device 2A, the control unit 4A can control the bypass valve 29 and the electromagnetic clutch 31 so as to turn ON the electromagnetic clutch 31 when the bypass valve 29 is open, and to close the bypass valve 29 after the refrigerant is circulated while bypassing the expander 23. Furthermore, when stopping the Rankine cycle device 2A, the control unit 4A can control the bypass valve 29 and the electromagnetic clutch 31 so as to turn the electromagnetic clutch 31 OFF after the bypass valve 29 is first opened to circulate the refrigerant while bypassing the expander 23.

Next, referring to FIG. 2, the structure of the pump-integrated expander 27 will be described.

Figure 2:
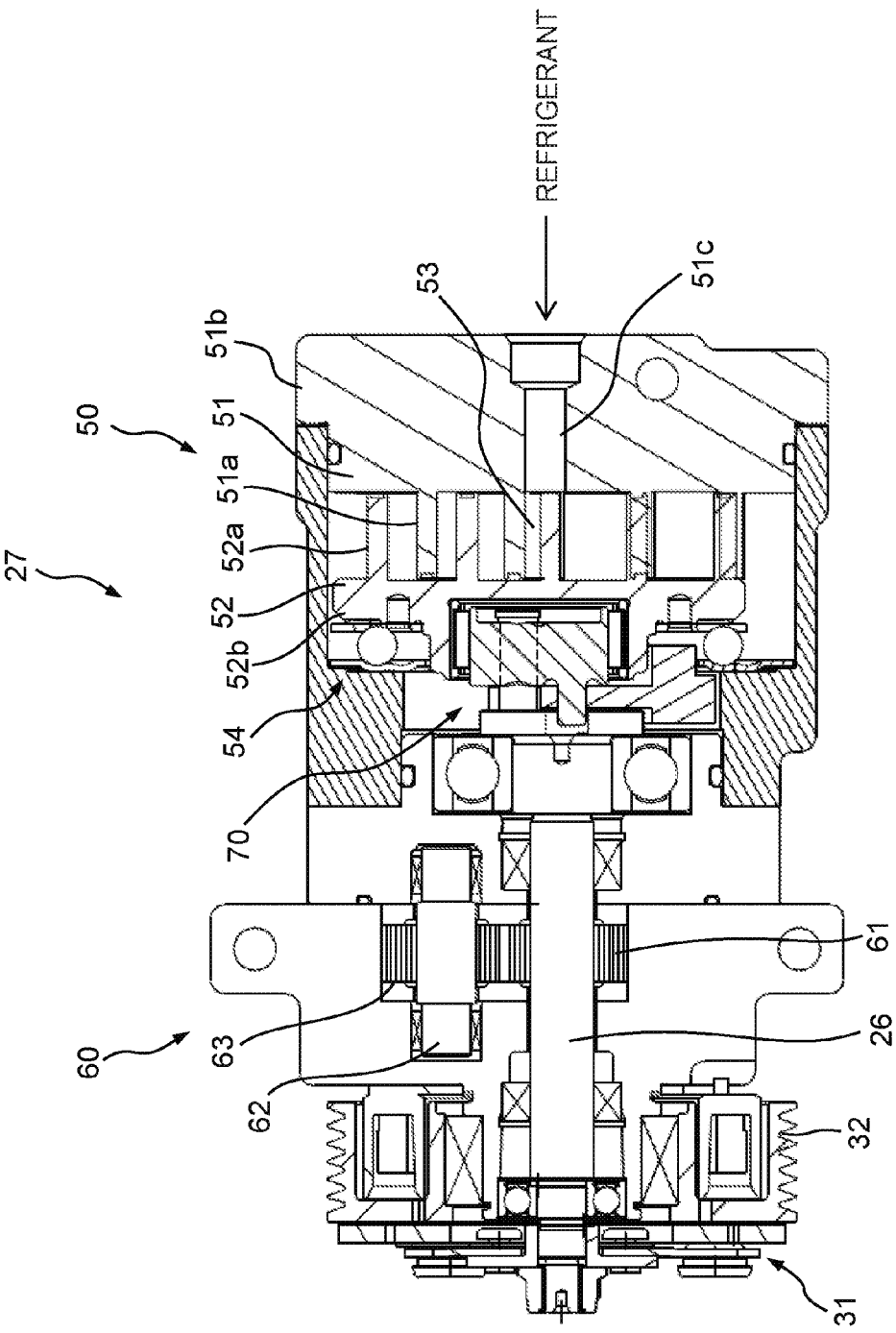
FIG. 2 is a view illustrating the structure of a pump-integrated expander.

As illustrated in FIG. 2, the pump-integrated expander 27 includes an expansion unit 50 functioning as the expander (scroll-type expander) 23, a pump unit 60 functioning as a pump (mechanical pump) 25, and a driven crank mechanism 70 arranged between the expansion unit 50 and the pump unit 60.

The expansion unit 50 includes a fixed scroll 51 and a movable scroll 52. The fixed scroll 51 and the movable scroll 52 are arranged so that scroll parts 51a and 52a are engaged with each other, and an expansion chamber 53 is formed between the scroll part 51a of the fixed scroll 51 and the scroll part 52a of the movable scroll 52. In the expansion chamber 53, the refrigerant passing through the heater 22 is introduced through a refrigerant passage 51c formed in a base 51b of the fixed scroll 51. Then, the refrigerant introduced in the expansion chamber 53 is expanded to cause the movable scroll 52 to make orbiting motion relative to the fixed scroll 51.

Here, a ball coupling type anti-rotation mechanism 54 using balls as rolling elements is provided on the rear side of the base 52b of the movable scroll 52 (on the opposite side of the scroll part 52a) so as to prevent the rotation of movable scroll 52 and to receive a thrust force acting on the movable scroll 52 when the movable scroll 52 makes orbiting motion.

If the liquid refrigerant is mixed into the expansion unit 50 (expander 23), an internal lubricant oil is washed away by the liquid refrigerant and the viscosity of the internal lubricant oil is reduced. Thus, there is a possibility that Internal sliding parts and rotating parts (especially, the anti-rotation mechanism 54 and the surround parts) lacks the lubrication. Therefore, it is preferred to stop the expansion unit 50, i.e., to stop the Rankine cycle device 2A when the liquid refrigerant is likely to be mixed into the expansion unit 50, such as when the superheat degree (SH) of the refrigerant on the inlet side of the expansion unit 50 is low.

However, if the Rankine cycle device 2A is stopped when the liquid refrigerant is likely to be mixed into the expansion unit 50, the Rankine cycle 2A is frequently stopped when the temperature Tw of the engine cooling water is low, especially in winter, or the like. Thus, there is a possibility that the chance to operate the Rankine cycle device 2A is significantly reduced. As a result, there is a possibility that since the number of times of starting up the Rankine cycle device 2A increases, the load on the engine 10 also increases.

In this regard, the ball coupling type anti-rotation mechanism 54 using balls as rolling elements has high durability and no failure such as seizure occurs in the ball coupling type anti-rotation mechanism 54 even in the case of a lack of lubrication. Therefore, in the embodiment, even when the liquid refrigerant is likely to be mixed into the expansion unit 50 during the operation of the Rankine cycle device 2A, the electromagnetic clutch 31 is maintained ON state until the consumed power of the Rankine cycle device 2A when the output thereof is negative becomes, or is expected to become, higher or equal to the consumed power when the Rankine cycle 2A is started to keep the operation of the expansion unit 50 (i.e., the operation of the Rankine cycle device 2A). This prevents the number of times of operating the Rankine cycle device 2 from being reduced and avoids the load on the engine 10 being substantially increased. Of course, this also has the advantage of eliminating the need for sensors and the like for detecting the superheat degree SH of the refrigerant and the like on the inlet side of the expansion unit 50.

Referring to FIG. 2, the pump unit 60 is a gear pump, including a driving gear 61 fixed to the rotating shaft 26, a driven shaft 62 arranged in parallel with the rotating shaft 26, and a driven gear 63 fixed to the driven shaft 62 and engaged with the driving gear 61. The rotating shaft 26 and the driven shaft 62 are rotatably supported by a shaft bearing. As mentioned above, the pulley 32 is attached on one end (the left side in FIG. 2) of the rotating shaft 26 through the electromagnetic clutch 31, and the other end (the right side in FIG. 2) of the rotating shaft 26 is coupled to the movable scroll 52 through the driven crank mechanism 70.

The driven crank mechanism 70 is, for example, a known swing-link type driven crank mechanism, which can convert the orbiting motion of the movable scroll 52 into the rotational motion of the rotating shaft 26, and furthermore, can convert the rotational motion of the rotating shaft 26 into the orbiting motion of the movable scroll 52.

Next, clutch control (control of the electromagnetic clutch 31) performed by the control unit 4A during the normal operation of the Rankine cycle device 2A after the completion of the start-up will be described.

Figure 3:
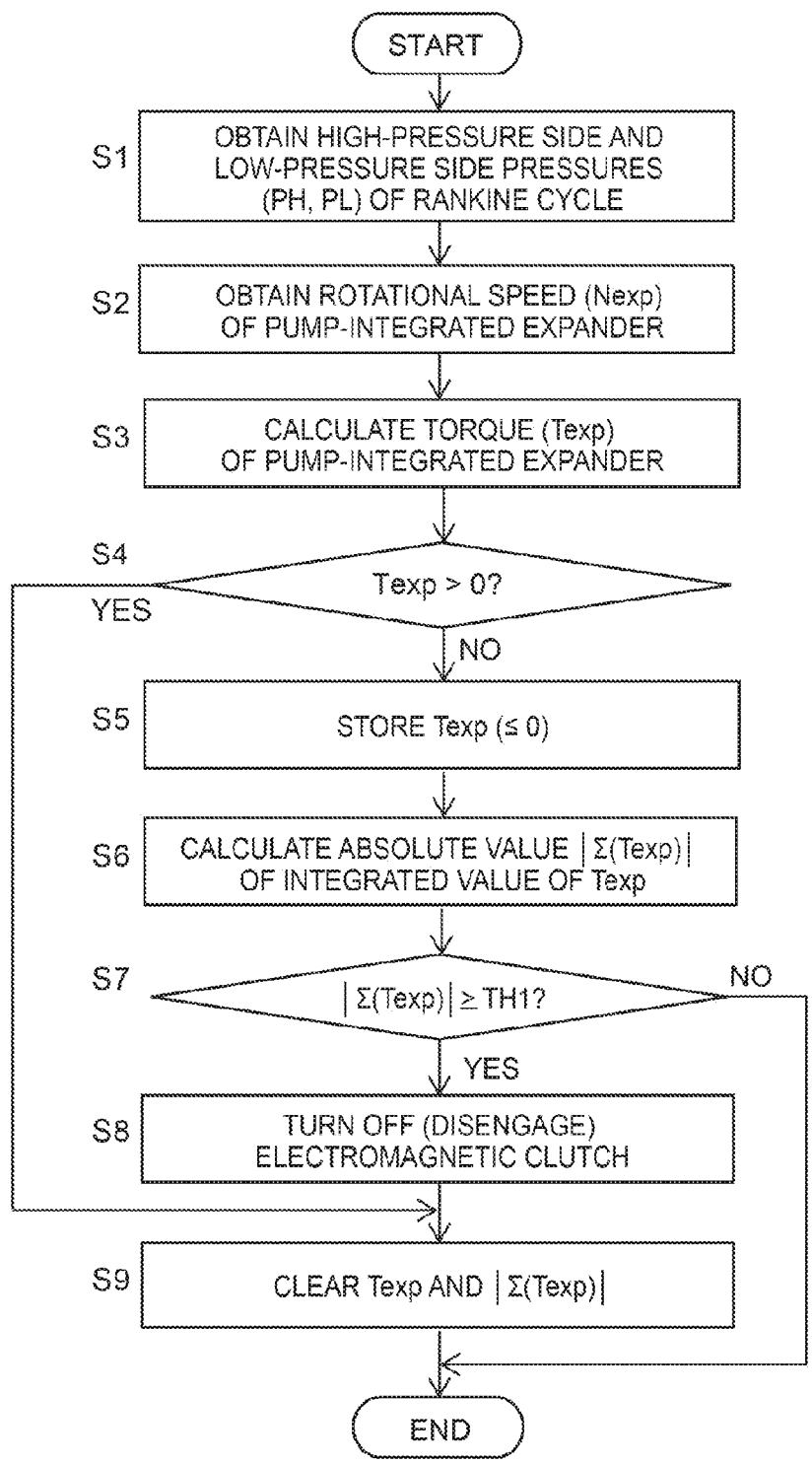
FIG. 3 is a flowchart illustrating the content of clutch control in the first embodiment.

FIG. 3 is a flowchart illustrating the content of such clutch control.

This flowchart is executed every predetermined time (e.g., 10 ms) after the completion of start-up of the Rankine cycle device 2A.

In FIG. 3, in step S1, the high-pressure side pressure PH and the low-pressure side pressure PL of the Rankine cycle 2A are obtained from the first pressure sensor 101 and the second pressure sensor 102.

In step S2, the rotational speed Nexp of the pump-integrated expander 27 is obtained from the rotation sensor 103. Alternatively, the rotational speed Nexp of the pump-integrated expander 27 is calculated based on the rotational speed Ne of the engine 10, and the pulley ratio between the pulley 31 and the crank pulley 32.

In step S3, based on the high-pressure side pressure PH, the low-pressure side pressure PL, and the rotational speed Nexp of the pump-integrated expander 27, the torque Texp of the pump-integrated expander 27 (i.e., the output of the Rankine cycle 2A) is computed. For example, the control unit 4A calculates the torque Texp of the pump-integrated expander 27 based on the following estimated equation:

$$Texp = M_1 \cdot (PH - PL) - M_2 \cdot Nexp - K_1.$$

Here, $M_1$ and $(-M_2)$ are coefficients, and $K_1$ is a constant number.

In step S4, it is determined whether the torque Texp of the pump-integrated expander 27 is positive (Texp>0). When the torque Texp of the pump-integrated expander 27 is zero or negative, the procedure proceeds to step S5. On the other hand, when the torque Texp of the pump-integrated expander 27 is positive, the procedure proceeds to step S9.

In step S5, the torque Texp (≤0) of the pump-integrated expander 27 is stored.

In step S6, the absolute value |Σ(Texp)| of an integrated value of the stored torque Texp is calculated. Thus, each time the torque Texp of the pump-integrated expander 27 is determined to be zero or negative in step S4, the zero or negative torque Texp is added. In other words, as the state in which the torque Texp of the pump-integrated expander 27 is zero or negative is continued, the absolute value |Σ(Texp)| of the integrated value of torque Texp becomes greater (the integrated value Σ(Texp) becomes smaller). "The absolute value |Σ(Texp)| of the integrated value of torque Texp" corresponds to a "second correlation value" of the present invention.

In step S7, it is determined whether the absolute value |Σ(Texp)| of the integrated value of torque Texp is greater than or equal to a threshold value TH1. When the absolute value |Σ(Texp)| of the integrated value of torque Texp is greater than or equal to the threshold value TH1, the procedure proceeds to step S8, while when it is smaller than the threshold value TH1, this flow is ended. The threshold value TH1 is set depending on the Rankine cycle device 2A, which can be a value greater than 0 and corresponding to the consumed power when the Rankine cycle device 2A is started, or a predetermined value smaller than or equal to the value. For example, the threshold value TH1 can take the absolute value of integrated value of each torque Texp computed from the start-up of the Rankine cycle 2A (from the start of driving the pump 25) until the torque Texp becomes "positive," ½ of the absolute value, or a predetermined value between them, i.e., a value obtained by multiplying the absolute value of each integrated value of torque Texp by a predetermined coefficient K (0.5 to 1.0). The threshold value TH1 corresponds to a "first correlation value" of the present invention. Note that the threshold value TH1 may be preset as a fixed value, or may be updated each time the Rankine cycle 2A is started up by calculating (the absolute value of) each integrated value of torque Texp during a period until the torque Texp becomes positive.

In step S8, a control signal is output to the electromagnetic clutch 31 to turn OFF (disengage) the electromagnetic clutch 31. This interrupts the power transmission between the engine 10 and the Rankine cycle device 2A to prevent the Rankine cycle device 2A from becoming the load on the engine 10.

In step S9, the stored torque Texp and the calculated absolute values |Σ(Texp)| of the integrated values of the torque Texp are cleared.

Figure 4:
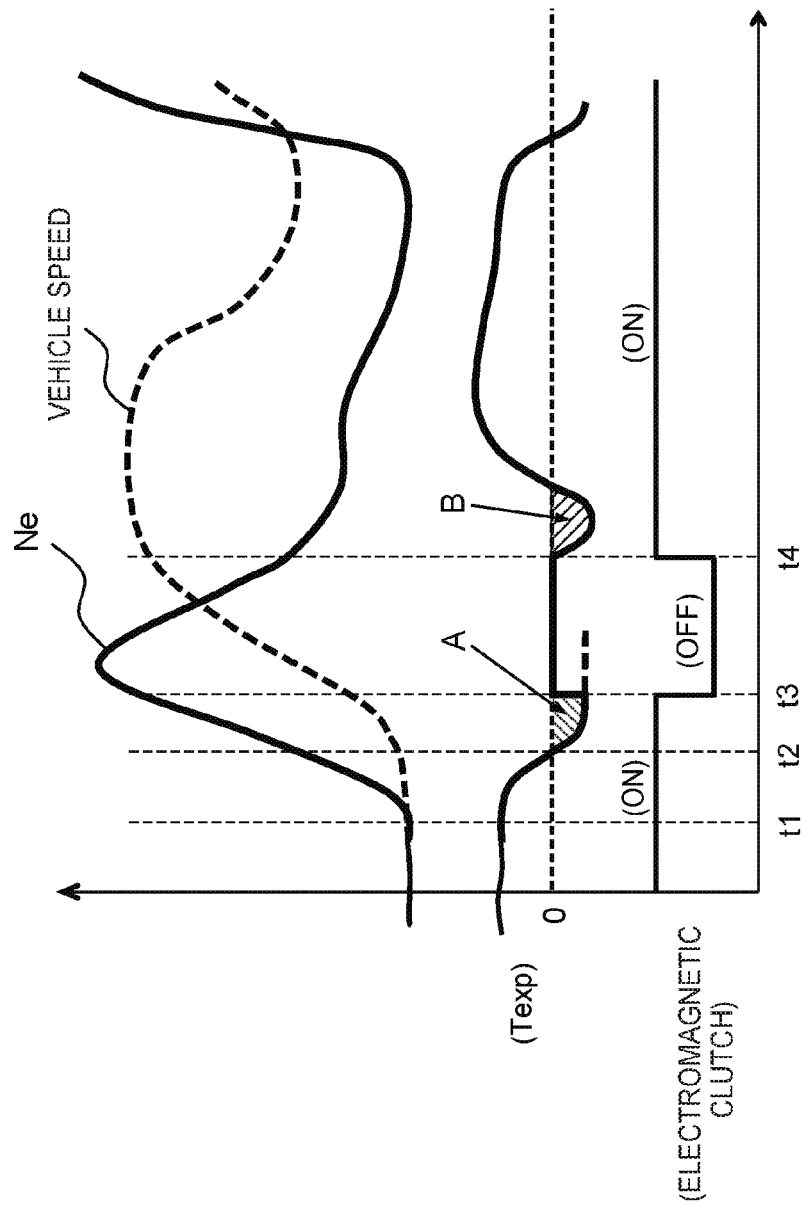
FIG. 4 is a time chart illustrating an example of the clutch state in the first embodiment.

FIG. 4 is a time chart illustrating an example of the state of the electromagnetic clutch 31 during the normal operation of the Rankine cycle device 2A after the completion of the start-up.

At time t1, the pump-integrated expander 27 generates positive torque (i.e., the output of the Rankine cycle device 2A is positive), and the engine 10 is assisted by the exhaust heat recovery device 1A. After that, when the rotational speed Ne of the engine 10 rises, the rotational speed Nexp of the pump-integrated expander 27 also rises along therewith. As a result, the torque Texp of the pump-integrated expander 27 drops, and in some cases, the torque Texp of the pump-integrated expander 27 becomes zero or less at time t2. Although the Rankine cycle device 2A begins becoming the load on the engine 10 at time t2, the electromagnetic clutch 31 remains ON state in the embodiment.

Then, when the absolute value |Σ(Texp)| of the integrated value of the torque Texp (≤0) of the pump-integrated expander 27 (see a hatched region A in FIG. 4) becomes the threshold value TH1 or greater (time t3), the electromagnetic clutch 31 is turned OFF (disengaged). Thus, the Rankine cycle device 2A is disconnected from the engine 10 (the Rankine cycle device 2A is stopped). After that, when the start-up conditions of the Rankine cycle device 2A are satisfied (time t4), the electromagnetic clutch 31 is turned ON (engaged) again to start up the Rankine cycle device 2A. Here, a hatched region B in FIG. 4 corresponds to the absolute value of each integrated value of torque Texp computed during a period from the start-up of the Rankine cycle device 2A until the torque Texp becomes positive. In the embodiment, the absolute value of each integrated value of torque Texp (hatched region B) is set as the threshold value TH1 (the coefficient K=1).

As mentioned above, when the electromagnetic clutch 31 is turned OFF, the Rankine cycle device 2A is stopped. On the other hand, the Rankine cycle device 2A inevitably becomes the load on the engine 10 for a certain amount of time in order to start up (restart) the Rankine cycle device 2A. Therefore, if the electromagnetic clutch 31 is turned OFF at the time when the torque Texp of the pump-integrated expander 27 becomes zero or negative, the load on the engine 10 may increase rather than the case in which the electromagnetic clutch 31 is kept ON state. Furthermore, there is a possibility that the number of time of operating the Rankine cycle device 2A is significantly reduced.

In contrast, in the embodiment, the electromagnetic clutch 31 is not turned OFF immediately when the torque Texp of the pump-integrated expander 27 becomes zero or negative during the operation of the Rankine cycle device 2A. The electromagnetic clutch 31 is turned when the absolute value |Σ(Texp)| of the integrated value of torque Texp of the pump-integrated expander 27 becomes the threshold value TH1 or greater. That is, In a case that a value correlated with power consumed by the Rankine cycle device 2A when the output of the Rankine cycle device 2A is negative during the operation of the Rankine cycle device 2A is greater than or equal to a value correlated with power required when the Rankine cycle device 2A is started, the electromagnetic clutch 31 is turned OFF to stop the Rankine cycle device 2A. This can avoid the load on the engine 10 being substantially increased by turning the electromagnetic clutch 31 OFF, and prevent the fuel economy of the engine 10 from being decreased. Furthermore, since there is no need to stop the Rankine cycle device 2A when the torque Texp temporarily becomes negative, it is suppressed that the number of times of operating the Rankine cycle 2A is reduced. Furthermore, even when the liquid refrigerant is likely to be mixed into the expansion unit 50, since the Rankine cycle 2A is not stopped for this reason, it is also suppressed that the number of times of operating the Rankine cycle 2A is reduced.

In the above description, the electromagnetic clutch 31 is turned OFF when the absolute value |Σ(Texp)| of the integrated value of torque Texp of the pump-integrated expander 27 during the normal operation of the Rankine cycle device 2A becomes the threshold value TH1 or greater, but the present invention is not limited thereto.

For example, when the absolute value |Σ(Texp)| of the integrated value of torque Texp of the pump-integrated expander 27 is greater than or equal to the threshold value TH1 (the coefficient K<1.0) and the torque Texp is on a downward trend (e.g., when the value of the torque Texp calculated this time is smaller than the previously calculated value), there is a high possibility that the torque Texp is kept negative, and the consumed power of Rankine cycle device 2A during the operation is expected to be higher than or equal to the consumed power when the Rankine cycle device 2A is started. In such a case, the electromagnetic clutch 31 may be turned OFF. Preferably, the threshold value TH1 in this case is set to ½ of the absolute value of integrated value of each torque Texp computed during a period from the start-up of the Rankine cycle 2A until the torque Texp becomes positive (i.e., the coefficient K=0.5). Even in such a case, similar to the above embodiment, the load on the engine 10 is prevented from being substantially increased by turning the electromagnetic clutch 31 OFF, and the number of times of operating the Rankine cycle device 2A is prevented from being reduced.

Furthermore, when the integrated value of torque Texp of the pump-integrated expander 27 is negative and the torque Texp is expected to further decrease (that is, without making a comparison with the threshold value TH1), there is a high possibility that the torque Texp is kept negative, and the consumed power of the Rankine cycle device 2A during the operation thereof is expected to be higher than or equal to the consumed power when the Rankine cycle device 2A is started, and the fuel economy of the engine 10 is likely to be further decreased. In such a case, the electromagnetic clutch 31 may be turned OFF. Here, the case in which the torque Texp is expected to further decrease is a case in which the rotational speed Ne of the engine 10, i.e., the rotational speed Nexp of the pump-integrated expander 27 (especially, of the pump unit 60) rises (especially, rises sharply) which, for example, corresponds to a case in which a driver of the vehicle steps on an accelerator pedal by a predetermined amount or more, or a case in which the vehicle is downshifted. Even in such a case, the load on the engine 10 is prevented from being substantially increased by turning the electromagnetic clutch 31 OFF, and the number of times of operating the Rankine cycle 2A is prevented from being reduced.

Furthermore, these can also be combined and applied appropriately. For example, the electromagnetic clutch 31 can be turned OFF (1) when the absolute value |Σ(Texp)| of the integrated value of torque Texp is greater than or equal to the threshold value TH1 (the coefficient K=1.0), (2) when the absolute value |Σ(Texp)| of the integrated value of torque Texp is greater than or equal to the threshold value TH1 (0.5<the coefficient K<1.0) and the torque Texp is on a downward trend, or (3) when the integrated value of torque Texp is negative and the rotational speed of the engine 10 increases by a predetermined amount or more.

Second Embodiment

Next, a second embodiment of the present invention will be described.

Figure 5:
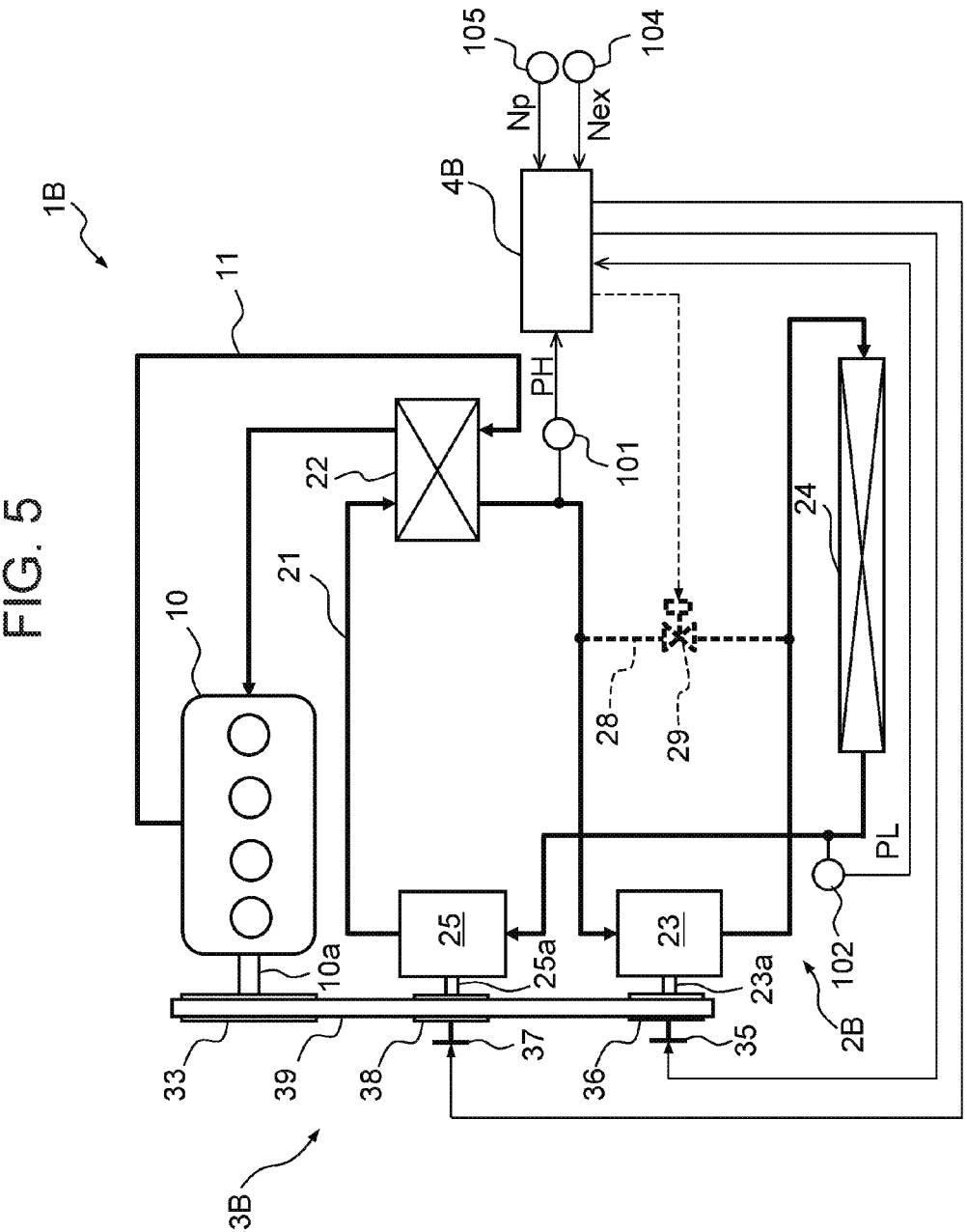
FIG. 5 is a view illustrating a schematic configuration of an exhaust heat recovery device according to a second embodiment of the present invention.

FIG. 5 illustrates a schematic configuration of an exhaust heat recovery device 1B according to the second embodiment of the present invention.

In the exhaust heat recovery device 1A according to the first embodiment, the expander 23 and the pump 25 as components of the Rankine cycle device are configured as the "pump-integrated expander 27" with both integrally connected by the common rotating shaft 26. In contrast, in an exhaust heat recovery device 1B according to the second embodiment, an expander (scroll-type expander) 23 and a pump (mechanical pump) 25 are provided separately. Note that the same components common to those in the first embodiment (FIG. 1) are given the same reference symbols, and the functions thereof are also similar to those of the first embodiment.

As illustrated in FIG. 5, the exhaust heat recovery device 1B according to the second embodiment includes a Rankine cycle device 2B in which the expander 23 and the pump 25 are provided separately, a power transmission mechanism 3B, and a control unit 4B. Since the basic structure of the Rankine cycle device 2B is the same as that of the Rankine cycle device 2A in the first embodiment, the description thereof will be omitted.

The power transmission mechanism 3B has a crank pulley 33 attached to a crankshaft 10a of an engine 10, an expander clutch 35, an expander pulley 36 attached to an output shaft 23a of the expander 23 through the expander clutch 35, a pump clutch 37, a pump pulley 38 attached to a drive shaft 25a of the pump 25 through the pump clutch 37, and a belt 39 wound around the crank pulley 33, the expander pulley 36, and the pump pulley 38.

Detection signals of various sensors are input to the control unit 4B, in which the various sensors include a first pressure sensor 101 for detecting high-pressure side pressure PH of the Rankine cycle device 2B, a second pressure sensor 102 for detecting low-pressure side pressure PL of the Rankine cycle device 2B, a first rotation sensor 104 for detecting the rotational speed Nex of the expander 23, and a second rotation sensor 105 for detecting the rotational speed Np of the pump 25. Then, based on the input detection signals of the various sensors and information from the engine control unit, the control unit 4B performs various control including the control (engagement and disengagement) of the expander clutch 35 and the pump clutch 36.

For example, when the start-up conditions of the Rankine cycle 2B are satisfied, the control unit 4B turns ON (engages) the expander clutch 35 and the pump clutch 37. Specifically, the pump clutch 37 is first turned ON, and when the expander 23 comes into a state of generating sufficient torque (e.g., torque greater than or equal to drive torque of the pump 25) after that, the expander clutch 35 is turned ON. The start-up conditions are the same as those in the first embodiment. Therefore, when the Rankine cycle device 2B is started, the Rankine cycle device 2B, mainly the pump 25 thereof, becomes a load on the engine 10.

Here, as indicated by the broken line in FIG. 5, when a bypass flow passage 28 for bypassing the expander 23 and a bypass valve 29 for opening and closing the bypass flow passage 28 are provided, the control unit 4B may control the bypass valve 29, the expander clutch 35, and the pump clutch 37 to turn ON the expander clutch 35 and the pump clutch 37 when the bypass valve 29 is open to thereafter close the bypass valve 29, or to turn ON the pump clutch 37 when the bypass valve 29 is open and close the bypass valve 29 at about the same timing as turning ON the expander clutch 35.

Furthermore, during the operation of the Rankine cycle device 2B, for example, when determining that there is a need to stop the Rankine cycle device 2B, or when receiving a request for stopping the Rankine cycle device 2B from the engine control unit, the control unit 4B turns OFF (disengages) the expander clutch 35 and the pump clutch 37 to stop the Rankine cycle device 2B. Preferably, the pump clutch 37 is first turned OFF, and then the expander clutch 35 is turned OFF.

Here, when the bypass flow passage 28 and the bypass valve 29 are provided, for example, the control unit 4B may control the bypass valve 29, the expander clutch 36, and the pump clutch 37 to open the bypass valve 29 after turning the pump clutch 37 OFF to thereafter turn the expander clutch 35 OFF.

Furthermore, the control unit 4B computes the output Tr (=the torque Tex of the expander 23−the drive (load) torque Tp of the pump 25) of the Rankine cycle device 2B every predetermined period, and turns OFF the expander clutch 35 and the pump clutch 37 in the ON state when the state in which the output (torque) Tr of the Rankine cycle device 2B is zero or negative is continued or when the negative state is expected to be continued during the normal operation of the Rankine cycle device 2B after starting up. This interrupts the power transmission between the engine 10 and the Rankine cycle 2B to stop the Rankine cycle device 2B. For example, when the superheat degree of the refrigerant on the upstream side of the expander 23 is insufficient or when the thermal load of a condenser 24 is large, a pressure difference before and after the expander 23 may be insufficiently, resulting in torque Tex of the expander 23 being less than or equal to the drive torque Tp of the pump 25. Furthermore, when the engine speed increases rapidly at the time of rapid acceleration or the like, the torque Tex of the expander 23 may become negative due to overexpansion. In such a case, the output Tr of the Rankine cycle device 2B can become zero or negative.

Specifically, similar to the first embodiment, the control unit 4B turns OFF the expander clutch 35 and the pump clutch 37 in the ON state to stop the Rankine cycle device 2B in a case that the consumed power (or the correlation value) of the Rankine cycle device 2B when the output of the Rankine cycle device 2B is negative during the operation of the Rankine cycle device 2B after start-up becomes, or is expected to become, higher than or equal to the consumed power (or the correlation value) when the Rankine cycle device 2B is started.

In the embodiment, the consumed power when the Rankine cycle device 2B is started means power consumed by the Rankine cycle device 2B (mainly by the pump 25) from the start-up of the Rankine cycle device 2B in the stopped state (from the start of driving the pump 25) until the output of the Rankine cycle device 2B becomes "positive."

Furthermore, when the start-up conditions are satisfied after the expander clutch 35 and the pump clutch 37 are turned OFF, the control unit 4B can turn ON the expander clutch 35 and the pump clutch 37 again to start up the Rankine cycle device 2B.

FIG. 6 is a flowchart illustrating the content of clutch control (control of the expander clutch 35 and the pump clutch 37) performed by the control unit 4B. This flowchart is executed every predetermined time (e.g., 10 ms) after the completion of start-up of the Rankine cycle device 2B.

In FIG. 6, in step S11, the high-pressure side pressure PH and the low-pressure side pressure PL of the Rankine cycle device 2B are obtained from the first pressure sensor 101 and the second pressure sensor 102.

In step S12, the rotational speed Nex of the expander 23 and the rotational speed Np of the pump 25 are obtained from the first rotation sensor 104 and the second rotation sensor 105. Of course, the rotational speed Nex of the expander 23 and the rotational speed Np of the pump 25 can also be calculated based on the rotational speed Ne of the engine 10 and the pulley ratio, respectively.

In step S13, the torque Tex of the expander 23 is calculated based on the high-pressure side pressure PH, the low-pressure side pressure PL, and the rotational speed Nex of the expander 23. For example, the torque Tex of the expander 23 is calculated based on the following estimated equation:

$$Tex = M_3 \cdot (PH-PL) - M_4 \cdot Nex - K_2.$$

Here, $M_3$, $(-M_4)$ are coefficients, and $K_2$ is a constant number.

In step S14, the drive torque (load torque) Tp of the pump 25 is calculated based on the high-pressure side pressure PH, the low-pressure side pressure PL, and the rotational speed Np of the pump 25. For example, the control unit 4B has a pump load map, in which a refrigerant pressure difference (PH−PL), the rotational speed Np of the pump 25, and the drive (load) torque Tp of the pump 25 are associated with one another. The control unit 4B refers to the pump load map to calculate the drive torque Tp of the pump 25 based on the refrigerant pressure difference (PH−PL) and the rotational speed Np of the pump 25. More simply, the drive torque Tp of the pump 25 may be calculated based only on the rotational speed Np of the pump 25.

In step S15, the drive torque Tp of the pump 25 is subtracted from the torque Tex of the expander 23 to calculate the output Tr (=Tex−Tp) of the Rankine cycle device 2B.

In step S16, it is determined whether the output of the Rankine cycle device 2B is positive or not. When the output Tr of the Rankine cycle device 2B is positive, the procedure proceeds to step S21, while when the output Tr of the Rankine cycle device 2B is zero or negative, the procedure proceeds to step S17.

In step S17, the output Tr (≤0) of the Rankine cycle device 2B is stored.

In step S18, the absolute value |Σ(Tr)| of an integrated value of stored output Tr of the Rankine cycle device 2B is calculated. Thus, each time the output Tr of the Rankine cycle device 2B is determined to be zero or negative in step S16, the zero or negative output Tr is added. As a result, as the state in which the output Tr of the Rankine cycle device 2B is zero or negative is continued, the absolute value |Σ(Tr)| of the integrated value of output Tr gradually becomes greater (the integrated value Σ(Tr) gradually becomes smaller). The absolute value |Σ(Tr)| of the integrated value of output Tr of the Rankine cycle device 2B corresponds to the "second correlation value" of the present invention.

In step S19, it is determined whether the absolute value |Σ(Tr)| of the integrated value of output Tr is greater than or equal to a threshold value TH2. When the absolute value |Σ(Tr)| of the integrated value of output Tr is greater than or equal to the threshold value TH2, the procedure proceeds to step S20, while when it is smaller than the threshold value TH2, this flow is ended. The threshold value TH2 is preset depending on the Rankine cycle device 2B, which can be a value greater than 0 and corresponding to the consumed power when the Rankine cycle device 2B is started, or a predetermined value smaller than or equal to the value. For example, the threshold value TH2 can take the absolute value of integrated value of each output Tr (=Tex−Tp=0−Tp) computed during a period from the start-up of the Rankine cycle 2B (from the start of driving the pump 25) until the output Tr becomes positive, ½ of the absolute value, or a predetermined value between them, i.e., a value obtained by multiplying the absolute value of integrated value of each output Tr by a predetermined coefficient K (0.5 to 1.0). This threshold value TH2 corresponds to the "first correlation value" of the present invention. Similar to the first embodiment, this threshold value TH2 may be a fixed value, or may be updated each time the Rankine cycle device 2B is started up.

In step S20, a release signal is output to the expander clutch 35 and the pump clutch 37 to turn OFF (disengage) both of the clutches 35 and 37. This interrupts the power transmission between the engine 10 and the Rankine cycle 2B. Here, although the expander clutch 35 and the pump clutch 37 may be disengaged at the same time, it is preferred to turn OFF the pump clutch 37 first and then turn OFF the expander clutch 35 similar to the control of stopping the Rankine cycle 2B mentioned above.

In step S21, the stored output Tr and the calculated absolute values |Σ(Tr)| of the integrated values of the output T are cleared.

Thus, even in the embodiment, similar to the first embodiment, when a value correlated with power consumed by the Rankine cycle device 2B when the output of the Rankine cycle device 2B is negative during the operation of the Rankine cycle device 2B is greater than or equal to a value correlated with power required when the Rankine cycle device 2B is started, the expander clutch 35 and the pump clutch 37 are turned OFF to stop the Rankine cycle 2B. This can avoid the load on the engine 10 being substantially increased by turning OFF the expander clutch 35 and the pump clutch 37, i.e., by disconnecting the Rankine cycle device 2B from the engine 10, to prevent the fuel economy of the engine 10 from to be decreased. This can further prevent the number of times of operating the Rankine cycle device 2B from being significantly reduced.

Here, similar to the first embodiment, the expander clutch 35 and the pump clutch 37 may be turned OFF when the absolute value |Σ(Tr)| of the integrated value of output Tr of the Rankine cycle device 2B is the threshold value TH2 (coefficient K<1.0, and preferably K=0.5) or greater and the output Tr is on a downward trend. Furthermore, the expander clutch 35 and the pump clutch 37 may be turned OFF when the output Tr of the Rankine cycle device 2B is negative and the output Tr is expected to further decrease (when the rotational speed of the engine 10 increases by a predetermined amount or more, or the like). Furthermore, these can also be combined and applied appropriately. In other words, the expander clutch 35 and the pump clutch 37 may be turned OFF (disengaged) to stop the Rankine cycle device 2B when power consumed by the Rankine cycle device 2B when the output of the Rankine cycle device 2B is negative during the operation of the Rankine cycle device 2B is expected to become greater than or equal to power required when the Rankine cycle device 2B is started.

Third Embodiment

Next, a third embodiment of the present invention will be described.

FIG. 7 illustrates a schematic configuration of an exhaust heat recovery device 1C according to the third embodiment of the present invention.

In the exhaust heat recovery device 1B according to the second embodiment, the pump 25 as a component of the Rankine cycle device is configured as a mechanical pump driven by the engine 10. In contrast, in the exhaust heat recovery device 1C according to the third embodiment, the pump of the Rankine cycle device is configured as an electrically powered pump 29 driven by electric power from a battery, not illustrated. Note that the same components common to those in the first embodiment (FIG. 1) and/or the second embodiment (FIG. 5) are given the same reference symbols, and the functions thereof are also similar to those of the first embodiment.

As illustrated in FIG. 7, the exhaust heat recovery device 1C according to the third embodiment includes a Rankine cycle device 2C having the electrically powered pump 29 as a pump for circulating the refrigerant, a power transmission mechanism 3C, and a control unit 4C. Since the structure of the Rankine cycle device 2C is the same as that of the Rankine cycle device 2B in the second embodiment except for the pump, the description thereof will be omitted. Note that the actuation of the electrically powered pump 29 is controlled by the control unit 4C.

The power transmission mechanism 3C has a crank pulley 33 attached to a crankshaft 10a of an engine 10, an expander clutch 35, an expander pulley 36 attached to an output shaft 23a of an expander 23 through the expander clutch 35, and a belt 40 wound around the crank pulley 33 and the expander pulley 36.

When start-up conditions of the Rankine cycle 2C are satisfied, the control unit 4C first supplies electric power from the battery to the electrically powered pump 29 to actuate the electrically powered pump 29, and then, in a state in which generated torque of the expander 23 becomes greater than or equal to a predetermined torque, the control unit 4C turns the expander clutch 35 ON. The start-up conditions are the same as those in the first and second embodiments.

The electrically powered pump 29 is driven by the electric power from the battery, and the amount of electric power consumed at the time needs to be (re-)charged by the engine 10. Therefore, the Rankine cycle device 2C (mainly the electrically powered pump 29) becomes a load on the engine 10 when the Rankine cycle device 2C is started. Note that the "state in which the generated torque of the expander 23 becomes greater than or equal to the predetermined torque" is, for example, a state in which the expander 23 generates torque corresponding to the load on the engine 10 to charge the amount of battery power consumed by the electrically powered pump 29 (hereinafter simply called "load-equivalent torque"), and this state is a state in which the output of the Rankine cycle device 2C becomes "positive."

Furthermore, for example, when the superheat degree of the refrigerant on the upstream side of the expander 23 is insufficient during the normal operation of the Rankine cycle device 2C after the start-up or when the thermal load of a condenser 24 is large, a pressure difference before and after the expander 23 may be insufficiently. In such a case, the expander 23 cannot generate the load-equivalent torque, i.e., cannot assist the load on the engine 10 in charging the battery by the amount of power consumed by the electrically powered pump 29, and hence the Rankine cycle device 2C including the electrically powered pump 29 becomes a load on the engine 10. In other words, the output of the Rankine cycle device 2C becomes "negative."

Therefore, in the embodiment, the control unit 4C computes the output Tr of the Rankine cycle device 2C (=the torque Tex of the expander 23–the load-equivalent torque) every predetermined period, and when a state in which the output (torque) of the Rankine cycle device 2C is zero or negative is continued or when the negative state is expected to be continued during the normal operation of the Rankine cycle device 2C after the start-up, the control unit 4C turns OFF the expander clutch 35 in the ON state.

Specifically, similar to the first and second embodiments, the control unit 4C turns OFF the expander clutch 35 in the ON state to stop the Rankine cycle device 2C when the consumed power (or the correlation value) of the Rankine cycle device 2C when the output of the Rankine cycle device 2C is negative during the operation of the Rankine cycle device 2C becomes, or is expected to become, greater than or equal to the consumed power (or the correlation value) when the Rankine cycle device 2C is started.

In the embodiment, the consumed power when the Rankine cycle device 2C is started means power consumed by the Rankine cycle device 2C (mainly by the electrically powered pump 29) during a period from the start-up of the Rankine cycle device 2C in the stopped state (from the start of driving the electrically powered pump 29) until the output Tr of the Rankine cycle device 2C becomes "positive."

Furthermore, in the embodiment, the control unit 4C can perform clutch control (see FIG. 6) by replacing the terms in the second embodiment as follows: The rotational speed Np of the pump 25 is replaced with the rotational speed of the electrically powered pump 29, the drive torque Tp of the pump is replaced with the load-equivalent torque, the threshold value TH2 is replaced with the threshold value TH3, and "turning OFF the pump clutch 37" is replaced with "stopping the electrically powered pump 29."

In this case, for example, the load-equivalent torque can be calculated as follows. A load-equivalent torque map in which the rotational speed of the electrically powered pump 29 is associated with the load-equivalent torque is preset so as to calculate the load-equivalent torque by referring to the load-equivalent torque map based on the rotational speed of the electrically powered pump 29. Furthermore, the threshold value TH3 can take the absolute value of integrated value of each output Tr(=0–the load-equivalent torque) during a period from the start-up of the Rankine cycle 2C (from the start of driving the electrically powered pump 29) until the output Tr of the Rankine cycle device 2C becomes positive, ½ of the absolute value, or a predetermined value between them, i.e., a value obtained by multiplying the absolute value of each integrated value of output Tr by a predetermined coefficient K (0.5 to 1.0). The rest is basically the same as in the second embodiment.

Although the embodiments of the present invention and variations have been described above, the present invention is not limited to the aforementioned embodiments and the variations thereof, and various modifications and changes are possible based on the technical ideas of the present invention.

REFERENCE SYMBOL LIST 1A, 1B, 1C . . . exhaust heat recovery device, 2A, 2B, 2C . . . Rankine cycle, 3A, 3B, 3C . . . power transmission mechanism, 4A, 4B, 4C . . . control unit, 10 . . . engine, 21 . . . refrigerant circulation passage, 22 . . . heater, 23 . . . expander, 24 . . . condenser, 25 . . . pump (mechanical pump), 27 . . . pump-integrated expander, 29 . . . electrically powered pump, 31 . . . electromagnetic clutch, 35 . . . expander clutch, 37 . . . pump clutch, 50 . . . expansion unit (expander), 51 . . . fixed scroll, 52 . . . movable scroll, 54 . . . anti-rotation mechanism, 60 . . . pump unit (mechanical pump), 101, 102 . . . pressure sensor, 103, 104, 105 . . . rotation sensor

The invention claimed is:

1. An exhaust heat recovery device comprising:
a Rankine cycle device that is provided with: a heater configured to heat and vaporize a refrigerant with exhaust heat of an engine; an expander configured to expand the refrigerant passed through the heater to generate power; a condenser configured to condense the refrigerant passed through the expander; and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged; and
a clutch control unit that controls engagement and disengagement of the clutch based on a first correlation value correlated with consumed power when the Rankine cycle device is started, and a second correlation value correlated with consumed power of the Rankine cycle device when the output thereof is negative during operation thereof after start-up,
wherein the clutch control unit disengages the clutch when an absolute value of the second correlation value is greater than or equal to an absolute value of the first correlation value during the engagement of the clutch.

2. The exhaust heat recovery device according to claim 1, wherein the clutch control unit disengages the clutch when the absolute value of the second correlation value is greater than or equal to the absolute value of the first correlation value and output of the Rankine cycle device is on a downward trend during the engagement of the clutch.

3. The exhaust heat recovery device according to claim 1, further comprising an output computing unit for computing the output of the Rankine cycle device,
wherein the first correlation value and the second correlation value are calculated based on output from the output computing unit.

4. The exhaust heat recovery device according to claim 3, wherein
the consumed power when the Rankine cycle device is started is an integrated value of output of the Rankine cycle device during a period from when the Rankine cycle device is started up until the output of the Rankine cycle device becomes positive, and
the consumed power of the Rankine cycle device when the output thereof is negative during operation thereof after the start-up is an integrated value of negative output of the Rankine cycle device during the operation thereof.

5. An exhaust heat recovery device comprising:
a Rankine cycle device that is provided with: a heater configured to heat and vaporize a refrigerant with exhaust heat of an engine, an expander configured to expand the refrigerant passed through the heater to generate power, a condenser configured to condense the refrigerant passed through the expander, and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged;
an output computing unit that computes output of the Rankine cycle device; and
a clutch control unit that disengages the clutch when a state in which the output of the Rankine cycle device is zero or negative is continued during the engagement of the clutch,
wherein the clutch control unit disengages the clutch when an absolute value of an integrated value of negative output of the Rankine cycle device becomes greater than or equal to predetermined threshold value during the engagement of the clutch.

6. The exhaust heat recovery device according to claim 5, wherein the clutch control unit disengages the clutch when the absolute value of the integrated value of negative output of the Rankine cycle device is greater than or equal to the predetermined threshold value and the output of the Rankine cycle device is on a downward trend during the engagement of the clutch.

7. The exhaust heat recovery device according to claim 3, wherein the pump is a mechanical pump driven by the engine,
wherein the output computing unit computes the output of the Rankine cycle device based on a pressure difference between a high-pressure side pressure and a low-pressure side pressure of the Rankine cycle device, a rotational speed of the expander, and a rotational speed of the mechanical pump.

8. The exhaust heat recovery device according to claim 1, wherein the pump is a mechanical pump driven by the engine.

9. The exhaust heat recovery device according to claim 8, wherein the expander and the mechanical pump are integrally connected.

10. The exhaust heat recovery device according to claim 1, wherein the expander is a scroll-type expander that has a fixed scroll and a movable scroll and generates power by expanding the refrigerant in an expansion chamber formed between the fixed scroll and the movable scroll, and a ball-coupling type anti-rotation mechanism using balls as rolling elements is provided to prevent the rotation of the movable scroll.

11. The exhaust heat recovery device according to claim 10, wherein even when a liquid refrigerant is likely to be mixed into the expander during the engagement of the clutch, the clutch control unit maintains an engagement state of the clutch until an absolute value of the second correlation value becomes greater than or equal to an absolute value of the first correlation value, or until an absolute value of an integrated value of negative output of the Rankine cycle device becomes greater than or equal to a predetermined threshold value.

12. The exhaust heat recovery device according to claim 5,
wherein the pump is a mechanical pump driven by the engine,
wherein the output computing unit computes the output of the Rankine cycle device based on a pressure difference between a high-pressure side pressure and a low-pressure side pressure of the Rankine cycle device, a rotational speed of the expander, and a rotational speed of the mechanical pump.

13. The exhaust heat recovery device according to claim 5, wherein the pump is a mechanical pump driven by the engine.

14. The exhaust heat recovery device according to claim 5, wherein the expander is a scroll-type expander that has a fixed scroll and a movable scroll and generates power by expanding the refrigerant in an expansion chamber formed between the fixed scroll and the movable scroll, and a ball-coupling type anti-rotation mechanism using balls as rolling elements is provided to prevent the rotation of the movable scroll.

15. The exhaust heat recovery device according to claim 9, wherein the expander is a scroll-type expander that has a fixed scroll and a movable scroll and generates power by expanding the refrigerant in an expansion chamber formed between the fixed scroll and the movable scroll, and a ball-coupling type anti-rotation mechanism using balls as rolling elements is provided to prevent the rotation of the movable scroll.

16. An exhaust heat recovery device comprising:
a Rankine cycle device that is provided with: a heater configured to heat and vaporize a refrigerant with exhaust heat of an engine; an expander configured to expand the refrigerant passed through the heater to generate power; a condenser configured to condense the refrigerant passed through the expander; and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged; and
a clutch control unit that controls engagement and disengagement of the clutch based on a first correlation value correlated with consumed power when the Rankine cycle device is started, and a second correlation value correlated with consumed power of the Rankine cycle device when the output thereof is negative during operation thereof after start-up,
wherein the clutch control unit disengages the clutch when an absolute value of the second correlation value is greater than or equal to an absolute value of the first correlation value and output of the Rankine cycle device is on a downward trend during the engagement of the clutch.

17. An exhaust heat recovery device comprising:
a Rankine cycle device that is provided with: a heater configured to heat and vaporize a refrigerant with exhaust heat of an engine, an expander configured to expand the refrigerant passed through the heater to generate power, a condenser configured to condense the refrigerant passed through the expander, and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged;
an output computing unit that computes output of the Rankine cycle device; and
a clutch control unit that disengages the clutch when a state in which the output of the Rankine cycle device is zero or negative is continued during the engagement of the clutch,
wherein the clutch control unit disengages the clutch when an absolute value of an integrated value of negative output of the Rankine cycle device is greater than or equal to a predetermined threshold value and the output of the Rankine cycle device is on a downward trend during the engagement of the clutch.

18. An exhaust heat recovery device comprising:
a Rankine cycle device that is provided with: a heater configured to heat and vaporize a refrigerant with exhaust heat of an engine; an expander configured to expand the refrigerant passed through the heater to generate power; a condenser configured to condense the refrigerant passed through the expander; and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged;
an output computing unit for computing the output of the Rankine cycle device; and
a clutch control unit that controls engagement and disengagement of the clutch based on a first correlation value correlated with consumed power when the Rankine cycle device is started, and a second correlation value correlated with consumed power of the Rankine cycle device when the output thereof is negative during operation thereof after start-up,
wherein the first correlation value and the second correlation value are calculated based on output from the output computing unit,
wherein
the consumed power when the Rankine cycle device is started is an integrated value of output of the Rankine cycle device during a period from when the Rankine cycle device is started up until the output of the Rankine cycle device becomes positive, and
the consumed power of the Rankine cycle device when the output thereof is negative during operation thereof after the start-up is an integrated value of negative output of the Rankine cycle device during the operation thereof.

19. An exhaust heat recovery device comprising:
a Rankine cycle device that is provided with: a heater configured to heat and vaporize a refrigerant with exhaust heat of an engine; an expander configured to expand the refrigerant passed through the heater to generate power; a condenser configured to condense the refrigerant passed through the expander; and a pump configured to send the refrigerant passed through the condenser to the heater, the heater, the expander, the condenser, and the pump being arranged in a refrigerant circulation passage;
a power transmission mechanism that has a clutch and is capable of transmitting power between the engine and the Rankine cycle device when the clutch is engaged; and
a clutch control unit that controls engagement and disengagement of the clutch based on a first correlation value correlated with consumed power when the Rankine cycle device is started, and a second correlation value correlated with consumed power of the Rankine cycle device when the output thereof is negative during operation thereof after start-up,
wherein the expander is a scroll-type expander that has a fixed scroll and a movable scroll and generates power by expanding the refrigerant in an expansion chamber formed between the fixed scroll and the movable scroll, and a ball-coupling type anti-rotation mechanism using balls as rolling elements is provided to prevent the rotation of the movable scroll,
wherein even when a liquid refrigerant is likely to be mixed into the expander during the engagement of the clutch, the clutch control unit maintains an engagement state of the clutch until an absolute value of the second correlation value becomes greater than or equal to an absolute value of the first correlation value, or until an absolute value of an integrated value of negative output of the Rankine cycle device becomes greater than or equal to a predetermined threshold value.

* * * * *